(12) United States Patent
Ben-Mansour

(10) Patent No.: US 7,980,136 B2
(45) Date of Patent: Jul. 19, 2011

(54) LEAK AND CONTAMINATION DETECTION MICRO-SUBMARINE

(75) Inventor: Rached Ben-Mansour, Dhahran (SA)

(73) Assignee: King Fahd University of Petroleum and Minerals, Dahran (SA)

( * ) Notice: Subject to any disclaimer, the term of this patent is extended or adjusted under 35 U.S.C. 154(b) by 471 days.

(21) Appl. No.: 12/232,373

(22) Filed: Sep. 16, 2008

(65) Prior Publication Data

US 2010/0064775 A1    Mar. 18, 2010

(51) Int. Cl.
*G01M 3/24*    (2006.01)
(52) U.S. Cl. ............................ 73/592; 73/52; 73/40.5 A
(58) Field of Classification Search ...................... 73/592
See application file for complete search history.

(56) References Cited

U.S. PATENT DOCUMENTS

| | | | |
|---|---|---|---|
| 3,691,819 A * | 9/1972 | Guest | 73/40.5 A |
| 3,837,214 A * | 9/1974 | Guest | 73/40.5 R |
| 4,579,457 A * | 4/1986 | Guigues | 356/436 |
| 4,996,879 A | 3/1991 | Kruka et al. | |
| 5,675,506 A | 10/1997 | Savic | |
| 5,974,862 A | 11/1999 | Lander et al. | |
| 6,530,263 B1 | 3/2003 | Chana | |
| 2002/0134140 A1 | 9/2002 | Baumoel | |
| 2003/0167847 A1 | 9/2003 | Brown et al. | |
| 2004/0128034 A1 | 7/2004 | Lenker et al. | |
| 2005/0223825 A1 * | 10/2005 | Janssen | 73/865.8 |
| 2006/0174707 A1 | 8/2006 | Zhang | |
| 2008/0204008 A1 * | 8/2008 | Paulson | 324/220 |

FOREIGN PATENT DOCUMENTS

| | | |
|---|---|---|
| CA | 2621035 | 4/2007 |
| GB | 2364126 | 1/2002 |
| WO | WO 2004031719 | 4/2004 |

OTHER PUBLICATIONS

"Vehicle-Mounted Natural Gas Leak Detector"; http://es.epa.gov/ncer/sbir/success/pdf/vehicle.pdf; 2 pages; printed on Jun. 16, 2008.

* cited by examiner

*Primary Examiner* — Hezron Williams
*Assistant Examiner* — Paul West
(74) *Attorney, Agent, or Firm* — Richard C. Litman

(57) ABSTRACT

The leak and contamination detection micro-submarine includes an "electronic ear" and an "electronic nose" for detecting both leaks and chemicals within a pipe which may be leaking. The submarine includes an on-board electric motor which is radio remote controlled and may operate, or swim, in a manner similar to a fish using piezoelectric micromotors and the like. Contamination, leak and other related data is stored in on-board memory and summary reports may be transmitted via RF signals.

15 Claims, 3 Drawing Sheets

LEAK AND CONTAMINATION DETECTION MICRO-SUBMARINE

BACKGROUND OF THE INVENTION

1. Field of the Invention

The present invention relates generally to devices for detecting leaks and contamination in fluid systems, and more particularly to a leak and contamination detection micro-submarine having robotic or remotely controlled electronic sensor systems for detecting faults in fluid systems.

2. Description of the Related Art

The problem of water leakage from water pipelines causes clean water loss, energy loss and a major increase in water contamination with hazardous chemicals and metals. Water leakage can reach 50% of the water transported across the water distribution network. It is reported that 30% of the water transported across KSA is lost through leakage. These losses are very high and do amount to millions of dollars. Furthermore, the problem of leakage implies penetration of hazardous contaminants into the water distribution system. It has been reported by a group of medical doctors from the department of Oncology, King Faisal Specialist Hospital, Riyadh, Saudi Arabia; that water contamination causing esophageal cancer at Qassim region (KSA) constitutes a major health problem. Furthermore water leaks cause major infrastructure problems by undermining ground stability and, in the process damaging roads and buildings.

A lot of research work and technology developments have been accomplished in the last two decades to detect water leaks in water distribution networks. Leak detection devices include acoustic leak detection, leak noise correlators, surface listening devices, ground penetrating radar detection methods, and chemical tracing methods as well as X-Ray and Infra-Red radiation methods. In a recent study, the use of leak noise correlators proved unreliable and costly in addition to being time consuming. The use of electronic sound detectors proved more reliable and cost effective. The detectors were placed manually as close as possible to the pipelines.

Recently, a free-swimming leak detection system has been developed to overcome many shortcomings of the acoustic leak detection devices and systems available in the market. The free-swimming leak detector follows the flow of the water and takes advantage of being inside the pipe to clearly detect leaks. The information is stored inside a microprocessor; then downloaded once the detector is extracted from the pipeline. However the motion of this free-swimming leak detection system can not be controlled by the user. It has no contamination detection capability, and its spherical shape creates turbulent wake that interferes with a possible leak sound signal.

Thus, a leak and contamination detection micro-submarine solving the aforementioned problems is desired.

SUMMARY OF THE INVENTION

The leak and contamination detection micro-submarine includes an "electronic ear" and an "electronic nose" for detecting both leaks and chemicals within a pipe that may be leaking. The submarine includes an on-board electric motor, which is remotely controlled by radio, and which may operate or swim in a manner similar to a fish using piezoelectric micro-motors and the like. Contamination data is stored in on-board memory and summary reports may be transmitted via radio frequency (RF) signals.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
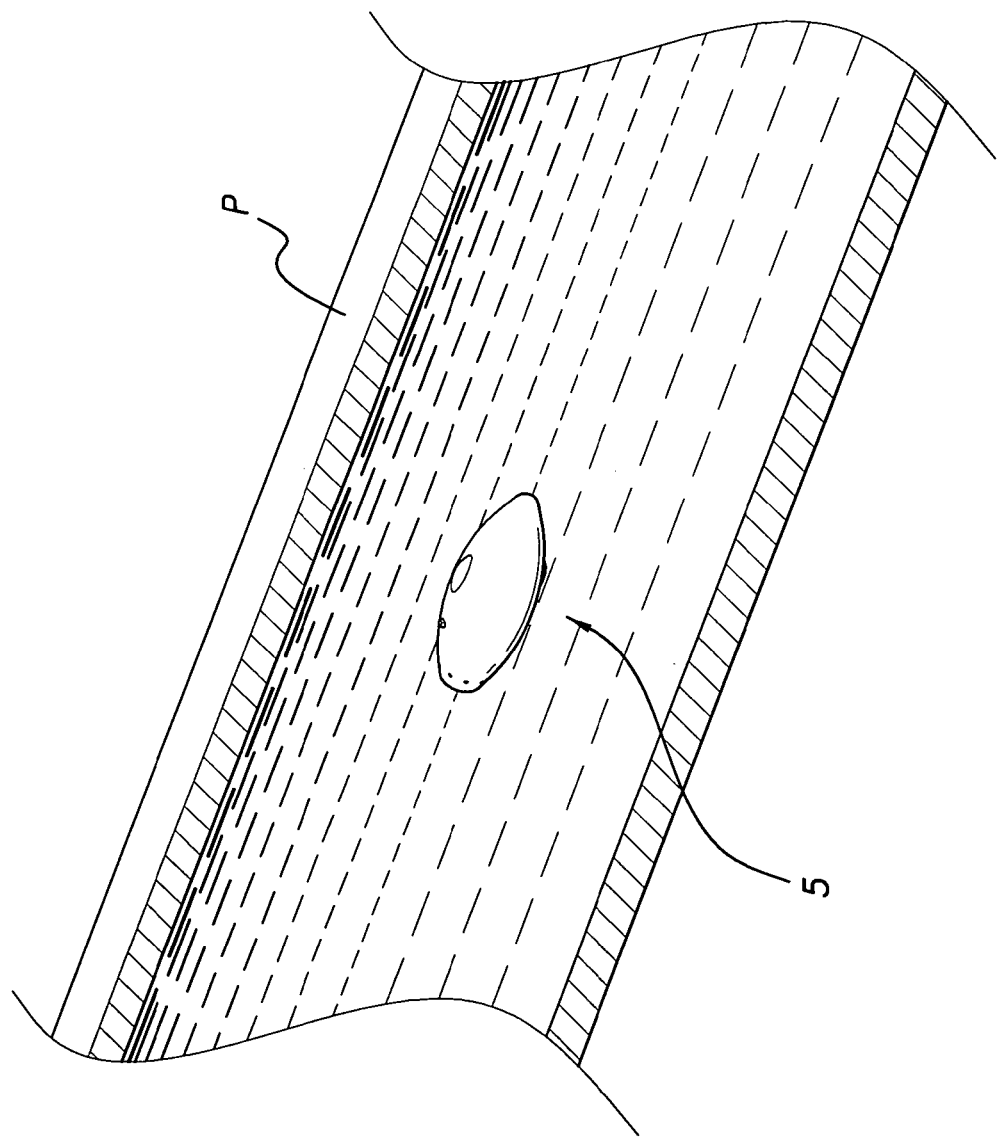
FIG. 1 is a partial environmental, perspective view of a leak and contamination detection micro-submarine according to the present invention.
Figure 2:
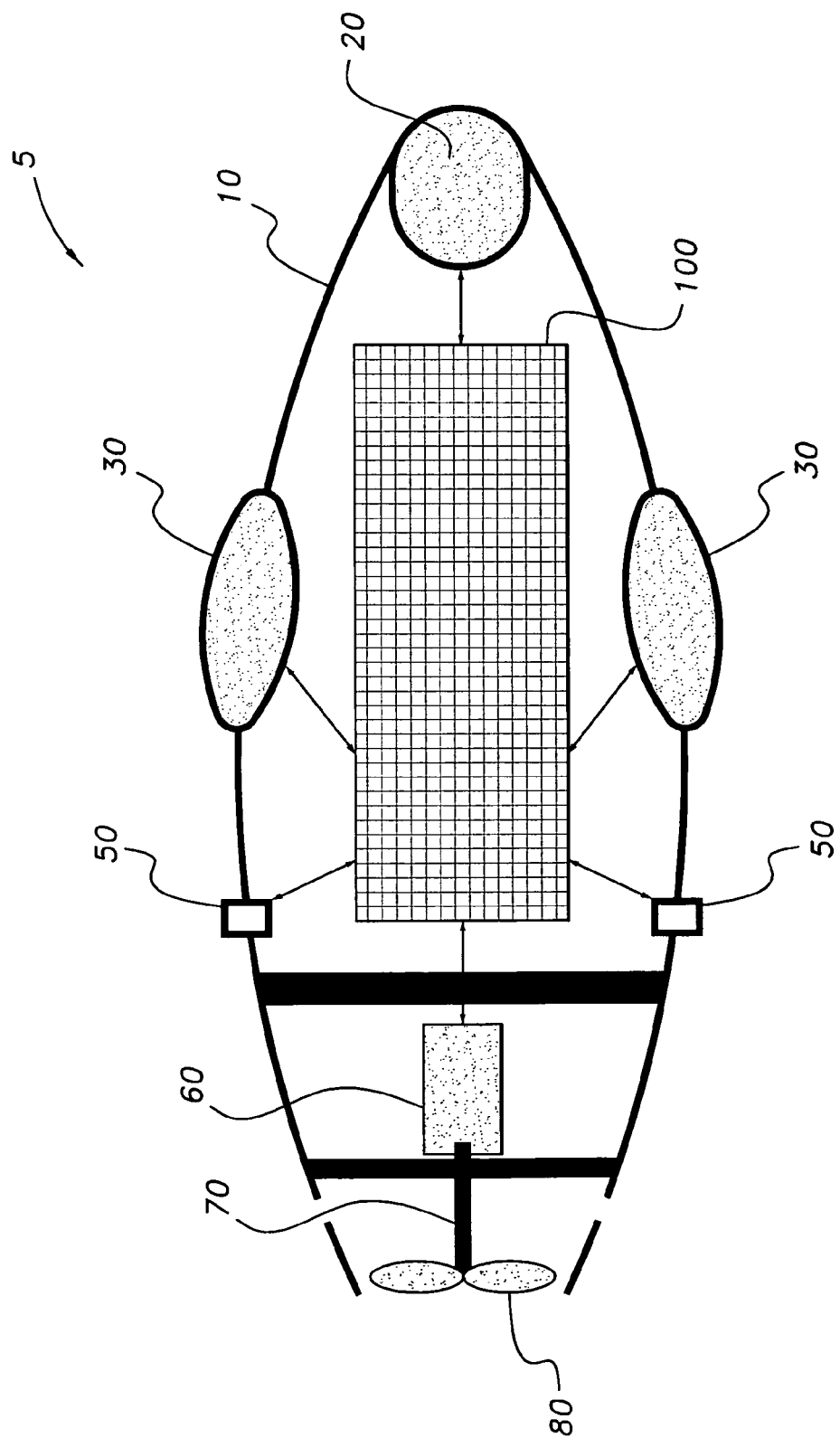
FIG. 2 is a schematic drawing of the leak and contamination detection micro-submarine according to the present invention, showing the relative location of various sensing systems.
Figure 3:
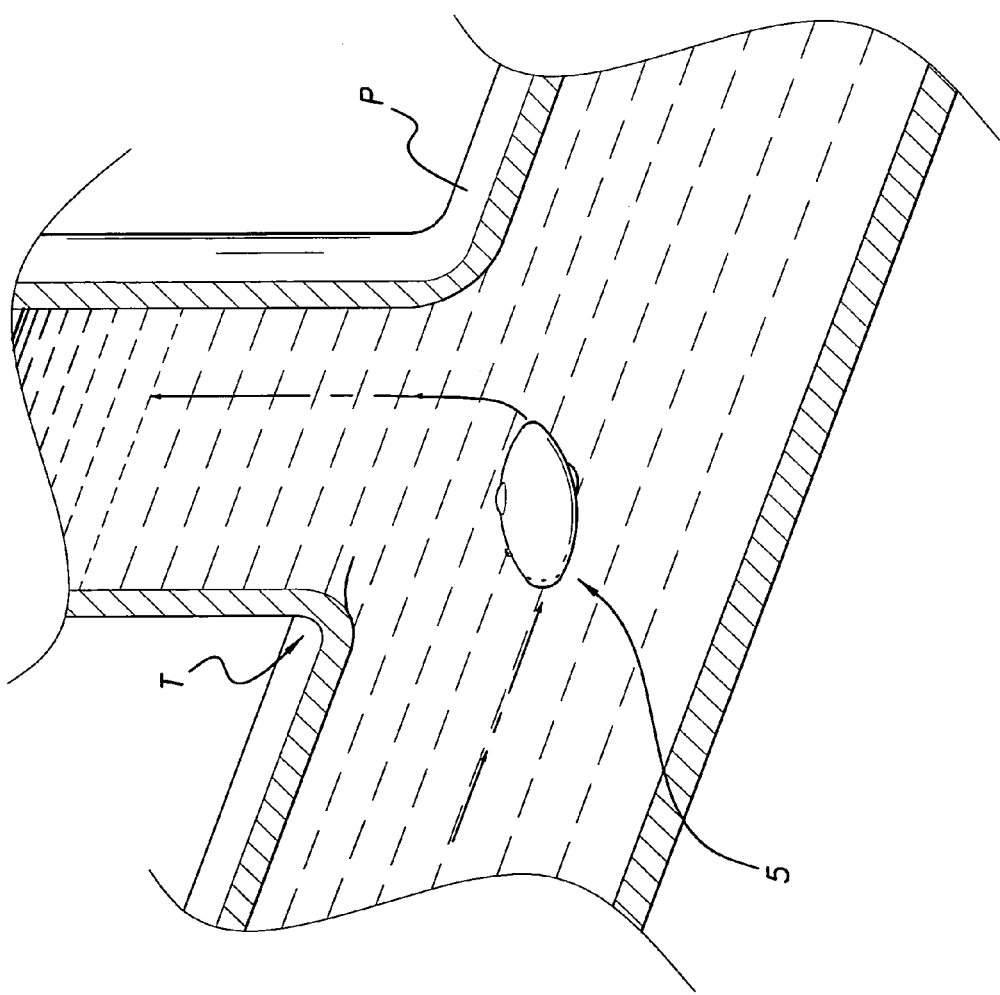
FIG. 3 is an environmental perspective view of the leak and contamination detection micro-submarine according to the present invention, showing the submarine negotiating a turn in a pipe T-junction.

As shown in FIGS. 1-3, the leak and contamination detection micro-submarine 5 includes acoustical leak detectors 30 and a contamination detector 20 for detecting both leaks and chemicals within a pipe that may be leaking. The submarine 5 includes an on-board electric motor 60, which is remotely controlled by radio, and which may operate or swim in a manner similar to a fish using piezoelectric micro-motors or the like. Contamination data is stored in on-board memory of computerized control system 100, and summary reports may be radio transmitted via RF antennas 50.

The leak detection system on board of micro-submarine 5 is accomplished through multi-sensing hardware/software capability, as follows.

First, a pair of hydrophones or vibration transducers 30 (so-called electronic ears) is used to collect the acoustic signal which computerized control system 100 can filter and process for leak detection.

Secondly, the contamination detector 20 is used to verify the leak occurrence and location using the concentration signal of contaminants.

Thirdly, an onboard piezo-electric pressure transducer is used to collect the static pressure around the micro-submarine. Computerized control system 100 filters, analyzes, and correlates the pressure signal with the acoustic and contamination signals to yield an accurate estimation of the leak magnitude and location.

The electronic leak/contamination detectors 20 and 30 include micro- and nanotechnology developed electrochemical transducers for heavy metals and an optical transducer for immiscible hydrocarbon droplets.

The submarine 5 is equipped with a temperature transducer to serve as additional check for leak or contamination events, and which can also be used for thermal drift correction of the electronic control system 100 on-board.

The micro-submarine 5 is propelled by an on board electric motor 60, which is controlled remotely by RF signals or other appropriate means. The controlled and motorized propulsion is used in order to direct the sensor-equipped micro-submarine 5 in a desired leg of a physical network of conduits (pipe).

The propulsion can alternatively be made by other mechanism similar to a fish; hence, an alternative name for the micro-submarine 5 is "micro-electronic sensing fish." Fish-like motion can be accomplished by incorporating a piezo-electric mechanism (smart materials) into control surfaces of the leak and contamination detection micro-submarine 5, the piezo-electric mechanism being capable of producing the action of an artificial fish.

The size of the micro-submarine/sensing fish 5 should be compatible to the size of the pipe P where leak/contamination sensing by the device 5 is employed, and small enough to pass through valves and pipe contractions across the physical network of pipes.

The shape of the micro-submarine/artificial fish 5 is hydrodynamic in order to minimize noise created by the wake of the on-board sensors, thereby producing a clearer acoustic signal from any leak, and for that matter, reducing background noise for all transducers onboard.

Normally, in a straight pipe section, the propelling action is turned off to conserve energy and reduce interference with acoustical signals from the environment of pipe P.

If the detector 5 is stuck in a valve or cannot negotiate a turn in an elbow or a tee, then controlled propulsion under the control of computerized control system 100 is used. Furthermore, reverse propulsion can be used to double-check a leak by measuring it more than once. When the propulsion is on, acoustic detection is turned off in order to reduce interference and get a clear detection signal.

All signals, including acoustic, chemical, pressure, and temperature signal data, are continuously stored on board and can be acquired by RF signals whenever necessary. Summary data is sent whenever a leak or hazardous contamination is detected.

The communication with the system 5, and the pinpointing of its location can be accomplished via the use of a mobile communication infrastructure and GPS information, or via a custom designed communications network of transponders across the physical network of pipes if more secure communication is required.

The system 5 can be customized for water distribution system as well as other liquid distribution system such as liquid fuels, oils (for the petrochemical industry), liquid food and drinks (for the food industry), and the like.

The micro-submarine 5 can be equipped with a micro-generator and side propellers to harvest flow energy and feed it back as electrical energy into an on-board battery to be used for the micro-motor 60 or the onboard electronics including sensors and computerized control system 100. This will lengthen the effective surveying time of the system 5 inside the pipe network.

A plurality of micro-submarine systems 5 can be deployed simultaneously in the same pipe leg to verify the occurrence of a leak or contamination event.

The leak and contamination detection micro-submarine 5 is schematically shown in FIG. 2. It should be noted that the micro-motor 60 is connected to a propeller 80 via an elongate drive shaft 70.

As shown in FIG. 1, the system 5 may coast-float with the propulsion system off while floating in a straight portion of pipe P. As shown in FIG. 3 the system 5 can activate propulsion under guidance of computerized control system 100 on when the system 5 needs to turn in a desired direction.

While most (99%) of the available leak detectors are based on outside-the-pipe method of detecting leaks, the leak and contamination detection micro-submarine 5 is advantageously based on an inside-the-pipe method. Moreover, the benefits of utilizing the leak and contamination detection micro-submarine 5 includes clarity of the leak signal, a substantial reduction in the amount of background noise, and effective filtering to easily characterize the noise produced by the regular flow inside the pipe.

Unlike limited outside-the-pipe methods, the leak and contamination detection micro-submarine 5 provides the capability of surveying an entire pipeline due to the fact that the system 5 can easily navigate through buried pipelines having irremovable obstacles.

Based on the fact that with almost every leak there will be contamination, the leak and contamination detection micro-submarine 5 uses the contamination signal from sensor 20 to strongly check/correlate the acoustic signal from acoustic sensors 30 in determining whether in fact a leak has been detected. Hence the contamination sensor 20 is not only used to detect contaminants inside the pipe but also as a strong indicator of a leak.

This method is mobile and easily controlled by the use of a micro-motor or piezo-electric actuation technique to stabilize it for reliable acoustic/vibration detection, and to maneuver the system around pipe tees (Ts) or through opened or partially opened valves. This mobility and movement controllability can tremendously reduce the cost of a leak detection system. In theory, only one system with these capabilities can be used to survey an entire water distribution network. However to complete the survey in a shorter time span, a plurality of systems 5 are preferably deployed simultaneously across the physical network of pipes.

The system 5 is easily introduced into the network of pipes by the use of a double-gated port valve that can be easily integrated into the pipe network. When the system 5 needs to be removed for data downloading and power recharge, it can be extracted through the closest double-gated port. This makes the additional infrastructure cost as well as the labor cost for deploying the system very minimal is contrast with traditional fixed leak detection systems available in the market. These fixed systems require many insertion points across the pipe network causing high pressure drop and possibility of leakage at a much higher cost.

It is to be understood that the present invention is not limited to the embodiment described above, but encompasses any and all embodiments within the scope of the following claims.

I claim:

1. A leak and contamination detection micro-submarine, comprising:
a micro-miniature hull;
a substance contamination detector housed in the micro-miniature hull;
an acoustical leak detector housed in the micro-miniature hull;
electronic control circuitry housed in the micro-miniature hull, the electronic control circuitry having circuits for accepting, filtering, analyzing, and correlating signals from the detectors, and, based on the signal filtering, analyzing, and correlating, the electronic control circuitry determining a leak/contamination condition in an immediate environment of the submarine;
a radio frequency transceiver mounted in the micro-miniature hull, the radio frequency transceiver remotely communicating the leak/contamination condition and a location of the submarine to the outside world;
a micro-miniature motor housed in the micro-miniature hull;
a drive shaft connected to the micro-miniature motor;
a propeller connected to the drive shaft, the combination of motor, drive shaft and propeller propelling the submarine through a fluid filled pipe; and
means for steering the submarine through the pipe and any joints the pipe may have, wherein said means for steering the submarine comprises piezoelectric means for changing a control surface portion of the hull.

2. The leak and contamination detection micro-submarine according to claim 1, wherein the means for steering the submarine is responsive to command signals received via a receiver portion of the radio frequency transceiver.

3. The leak and contamination detection micro-submarine according to claim 1, wherein an antenna portion of the radio frequency transceiver is mounted along an outside surface of the micro-miniature hull.

4. The leak and contamination detection micro-submarine according to claim 1, wherein the motor, radio frequency transceiver, acoustic detector, and the contamination detector, each, has a bi-directional communication link to the electronic control circuitry.

5. The leak and contamination detection micro-submarine according to claim 1, wherein the electronic control circuitry comprises a microprocessor.

6. The leak and contamination detection micro-submarine according to claim 1, further comprising an onboard piezo-electric pressure transducer, the piezo-electric pressure transducer collecting static pressure around the micro-submarine.

7. The leak and contamination detection micro-submarine according to claim 1, wherein the leak/contamination detectors further comprise micro/nanotech styled electrochemical transducers for heavy metals and an optical transducer for immiscible hydrocarbon droplets.

8. The leak and contamination detection micro-submarine according to claim 1, further comprising a temperature transducer, the temperature transducer serving as an additional check for leak/contamination events, the temperature transducer being used for thermal drift correction of the electronic control circuitry.

9. The leak and contamination detection micro-submarine according to claim 1, wherein the hull has a hydrodynamic shape, the hydrodynamic shape of the hull minimizing noise created by the wake of the on-board detectors thereby producing clearer signals from the on-board detectors.

10. The leak and contamination detection micro-submarine according to claim 1, wherein the propulsion system can propel the submarine in reverse motion, the reverse motion of the submarine being used to double check a leak by measuring it more than once.

11. The leak and contamination detection micro-submarine according to claim 1, further comprising:
  means for deactivating acoustic detection when the propulsion system is activated; and
  means for activating acoustic detection when the propulsion system is deactivated.

12. The leak and contamination detection micro-submarine according to claim 1, further comprising:
  means for continuously storing all signals including acoustic, chemical, pressure and temperature signal data on board the submarine;
  means for transmitting the stored signal data to a remote location at any time; and
  means for transmitting summary data to a remote location whenever a leak or hazardous contamination has been detected by the submarine.

13. The leak and contamination detection micro-submarine according to claim 1, further comprising a micro-generator and side propellers, the micro-generator and side propellers in combination harvesting flow energy and feeding the flow energy back to provide electrical energy to charge an on-board electrical source for the micro-miniature motor and other electronics onboard.

14. The leak and contamination detection micro-submarine according to claim 1, wherein a plurality of leak and contamination detection micro-submarines are deployed in the same pipe system, the plurality verifying the occurrence of a leak/contamination event.

15. A leak and contamination detection micro-submarine, comprising:
  a micro-miniature hull;
  a substance contamination detector housed in the micro-miniature hull;
  an acoustical leak detector housed in the micro-miniature hull;
  electronic control circuitry housed in the micro-miniature hull, the electronic control circuitry having circuits for accepting, filtering, analyzing, and correlating signals from the detectors, and, based on the signal filtering, analyzing, and correlating, the electronic control circuitry determining a leak/contamination condition in an immediate environment of the submarine;
  a radio frequency transceiver mounted in the micro-miniature hull, the radio frequency transceiver remotely communicating the leak/contamination condition and a location of the submarine to the outside world;
  a micro-miniature motor housed in the micro-miniature hull;
  a drive shaft connected to the micro-miniature motor;
  a propeller connected to the drive shaft, the combination of motor, drive shaft and propeller propelling the submarine through a fluid filled pipe;
  means for steering the submarine through the pipe and any joints the pipe may have;
  a micro-generator; and
  a plurality of side propellers, wherein the micro-generator and the plurality of side propellers in combination harvest flow energy and feed the flow energy back to provide electrical energy to charge an on-board electrical source for the micro-miniature motor and other electronics onboard.

* * * * *